United States Patent [19]
Towner et al.

[11] Patent Number: 5,929,892
[45] Date of Patent: Jul. 27, 1999

[54] BEAM DEFLECTING FOR ENHANCED LASER PRINTER SCANNING

[75] Inventors: David K. Towner; Daniel R. Marshall; Robert J. Lawton, all of Boise, Id.

[73] Assignee: Hewlett-Packard Company, Palo Alto, Calif.

[21] Appl. No.: 08/703,241

[22] Filed: Aug. 26, 1996

[51] Int. Cl.$^6$ ........................................ B41J 2/47
[52] U.S. Cl. .................. 347/255; 347/239; 347/243; 347/260; 347/261
[58] Field of Search ................................... 347/129, 134, 347/239, 243, 251, 255, 256, 259, 260, 261; 359/245, 565, 349

[56] References Cited

U.S. PATENT DOCUMENTS

| | | | |
|---|---|---|---|
| 3,573,449 | 4/1971 | Maloney | 359/285 |
| 4,936,665 | 6/1990 | Whitney | 359/565 |
| 4,989,941 | 2/1991 | Soref | 385/16 |
| 5,424,780 | 6/1995 | Cooper | 348/428 |
| 5,592,207 | 1/1997 | Kobayashi et al. | 347/129 |

*Primary Examiner*—N. Le
*Assistant Examiner*—Hai C. Pham
*Attorney, Agent, or Firm*—Lane Simmons

[57] ABSTRACT

A system and method of providing a periodic trajectory scan path for a laser beam across a photoconductive surface in a laser printer. A preferred embodiment of the periodic trajectory for a system with a two-axis deflector includes a multiple-frequency omega wave trajectory for providing a substantially rectangular grid of available dot locations for selective laser beam pulsing. As such, a plurality of generally linear rows of dots are completed in a single scan pass of the laser beam across the surface. The periodic trajectory is provided by deflecting the laser beam with an optical beam deflector, such as an electro-optic deflector, placed between the laser and the rotating polygon scanning mirror. A preferred embodiment of the beam deflector includes a folded optical path.

44 Claims, 14 Drawing Sheets

BEAM DEFLECTING FOR ENHANCED LASER PRINTER SCANNING

CROSS REFERENCE TO RELATED APPLICATION

United States Patent Application of Robert J. Lawton et al., entitled "Beam Deflecting For Resolution Enhancement And Banding Reduction In A Laser Printer", filed Sep. 12, 1995, Ser. No. 08/528,488, (PD10950554), assigned to the assignee of this invention and incorporated herein in full by reference.

FIELD OF THE INVENTION

This invention relates in general to image forming technology and, more specifically, to providing enhanced laser beam scanning in a laser printer.

BACKGROUND OF THE INVENTION

In the computing industry, laser printers have become the standard for producing high quality, hard copy results. Laser printers operate, generally, by scanning a laser beam axially (in the "scan direction") across a photosensitive, electrically charged drum or belt. A picture element or "pixel" is a basic building block for creating images. In a laser printer a pixel has the form of a "dot" which is essentially an electrical charge imprint produced by exposing a photoconductive drum or belt to a focused pulse of laser light. The exposed area attracts toner which is subsequently transferred to paper or other print medium to create a corresponding dot in the final hard copy image. In conventional laser printers, each time the laser beam is scanned across the photoconductive surface, the laser power is modulated or "pulsed" at a rapid rate, each pulse creating one dot and each scan pass creating one row of closely spaced dots (sometimes called a "scan line"). Simultaneously, the photoconductive surface is moving in the process direction (at right angles to the scan direction, and sometimes called the "cross-scan direction") so that each successive scan produces a row of dots parallel to the preceding row but displaced due to motion of the photoconductive surface, thus forming a two-dimensional image as many successive rows of dots are written. Image resolution, as defined by the number of separately resolvable dots per inch (dpi), is one of the characteristics that determine the quality of the printer output. For example, a 600 dpi resolution laser printer has twice the resolution of a 300 dpi printer. Similarly, a 1200 dpi printer has twice the resolution of a 600 dpi printer.

Generally, the more dots per inch the better the image quality because the dots are smaller and closer together and can thereby more accurately define the edges and other details of the images produced. However, an increase in dpi usually increases a printer's manufacturing cost due to the increased memory and improved hardware required to produce the increased dpi. Accordingly, balancing the trade-offs between cost and performance is an ongoing issue in laser printer design.

One conventional method of increasing a printer's resolution has been to pulse the laser at higher frequency as the beam moves across the photoconductive drum in a conventional linear scan path. However, this method increases resolution in the scan direction only, without increasing resolution in the process direction (circumferential relative to the drum). Namely, more dots per inch are achieved in the scan direction but not in the process direction.

The development of gray scale technology has provided an alternative method for effectively increasing resolution. Gray scale selectively reduces the dot size in a printer to provide a better "fit" of the dots to the desired image and to provide a greater contrast range. Dot size ranges from 100% to about 20% of normal size, and is controlled by varying the pulse width (duration of the laser modulation pulse), but not the frequency of modulation. This technique, called pulse width modulation (PWM), changes the local size of the dots but not their location. A 300 dpi printer which uses PWM therefore still produces a pattern of dots at 300 dpi spacing, although the individual dots vary in size.

In addition to resolution enhancement, another performance characteristic of laser printers that is a candidate for improvement is printing speed. Given the continuous technological improvements in computing speeds, printing speeds must likewise be improved to satisfy consumer demands. Generally, however, to increase printing speed in laser printers, the multi-sided scanning mirror (polygon scanner) and the photoconductive drum must both be rotated at faster rates to provide greater output per unit of time. However, attempts to increase drum and polygon scanner rotation speeds typically present numerous mechanical difficulties and result in significantly increased manufacturing costs for the printer.

If the laser pulse width is modulated during scanning, variations in charge on the photoconductive surface will be translated into variations in dot size on a sheet of paper (such as discussed with gray scale). However, since human vision is very sensitive to small changes in gray level, this architecture has proven to be extremely sensitive to variations in drum speed. These variations appear on the printed page as increased or decreased spacing between lines and visually appear as "bands" parallel to the scan direction, and this undesirable effect is called "banding". Banding is a particularly severe problem for faster laser printers which are printing gray scale images, such as photographs. Research has shown that the most severe banding effects occur at intermediate levels of gray.

Most commercial printers use stepper motors with geared speed reducers to drive the photoconductive drum or belt. The principal cause of banding is speed reducer gear noise, although speed variations in the stepper motor and scanner can also contribute to this problem. Gear noise results from imperfect spacing of gear teeth, variances in flexing of gear teeth as forces are transferred from one gear to the next, and other intrinsic variations in gear force transfer. The stepper motor contributes to banding as it drives the gear train in a laser printer because of slight variations in angular velocity due to irregularities in the multiple magnet positions which define each step.

Since new printer products are consistently designed to print faster, and since the causes of banding tend to worsen at higher speeds, the problem of banding is likely to worsen in the future. Conventionally, attempts to reduce banding effects have been focused on finding mechanical methods for reducing gear noise and stepper motor speed variations. For example, attempted mechanical solutions may involve using gears with helical teeth or gears made from stiffer materials or with greater precision, but these improvements generally add significantly to the cost of the final product. Furthermore, these approaches attempt to address the root cause of the banding problem by producing a mechanically ideal open loop (without position feedback) motion control system. Namely, they attempt to rotate the drum at a constant speed with a motor drive system in which no feedback from any source is used to modify the motor speed or to correct any of the previously described contributions to banding. Although the cited Lawton application discloses randomly varying laser beam scanning for enhancing edge resolution and reducing banding, its methods are limited with respect to improving printer speed and resolution.

Accordingly, given the foregoing backgrounds relating to laser printer resolution, printing speed, and banding, objects of the present invention are to provide a new system and method for (1) increasing resolution in a laser printer with minimal increase in the hardware costs conventionally associated with enhanced resolution printers, (2) increasing printing speeds, and (3) reducing the visual impact of banding.

SUMMARY OF THE INVENTION

According to principles of the present invention, a system and method provide a two-dimensional periodic trajectory scan path for a laser beam across a photoconductive surface in a laser printer. The beam trajectory, being both temporally and spatially periodic, provides a substantially rectilinear grid of available dot locations for laser beam pulsing. A plurality of generally linear rows of dots parallel to the scan direction are created in each scan pass of the laser beam across the surface.

The laser beam is positioned not only by the usual polygon scanner in the scan direction, but also by an additional beam deflector which positions the beam in either the process direction alone, or in both the scan and process directions. The two-dimensional periodic beam trajectory is provided by the polygon scanner and the beam deflector acting together. Dot placement is provided along the trajectory by selectively modulating the laser relative to the phase of the periodic trajectory (as is customary in the art, phase is measured in radians with one cycle of the periodic trajectory containing $2\pi$ radians of phase).

Depending on design goals, including cost, complexity and application purposes, several preferred embodiments exists. In a system with a one-axis beam deflector operating only in the process direction, a preferred embodiment periodic trajectory scan path forms a triangle wave. In an improved system using a one-axis beam deflector, the deflector is aligned to operate in a direction intermediate between the scan and process directions and a preferred embodiment periodic trajectory scan path forms a sawtooth wave. In a system with a two-axis beam deflector (or, equivalently, with two one-axis deflectors) operating independently in the scan and process directions, a preferred embodiment periodic trajectory scan path forms a multiple-frequency omega wave. An improved system for generating the periodic trajectory scan paths of the present invention includes a beam deflector having a folded optical path.

As the beam moves along the periodic trajectory, the laser is modulated at appropriate locations (or, equivalently, at appropriate times) to produce multiple rows of dots (aligned parallel to the scan direction) during each scan of the beam across the drum. As successive rows of dots are created, a rectilinear grid of available dot locations is formed on the drum with regular spacing in two grid directions, which are preferably the scan direction (axial direction relative to drum, or x direction) and process direction (circumferential direction relative to drum, or y direction) but which may be otherwise aligned to form, for example, a parallelogram grid.

The periodic trajectory scan path of the present invention provides opportunity for increased printing speed and improved image quality (such as enhanced resolution and reduced banding). Other objects, advantages, and capabilities of the present invention will become more apparent as the description proceeds.

DETAILED DESCRIPTION OF THE INVENTION

Figure 1:
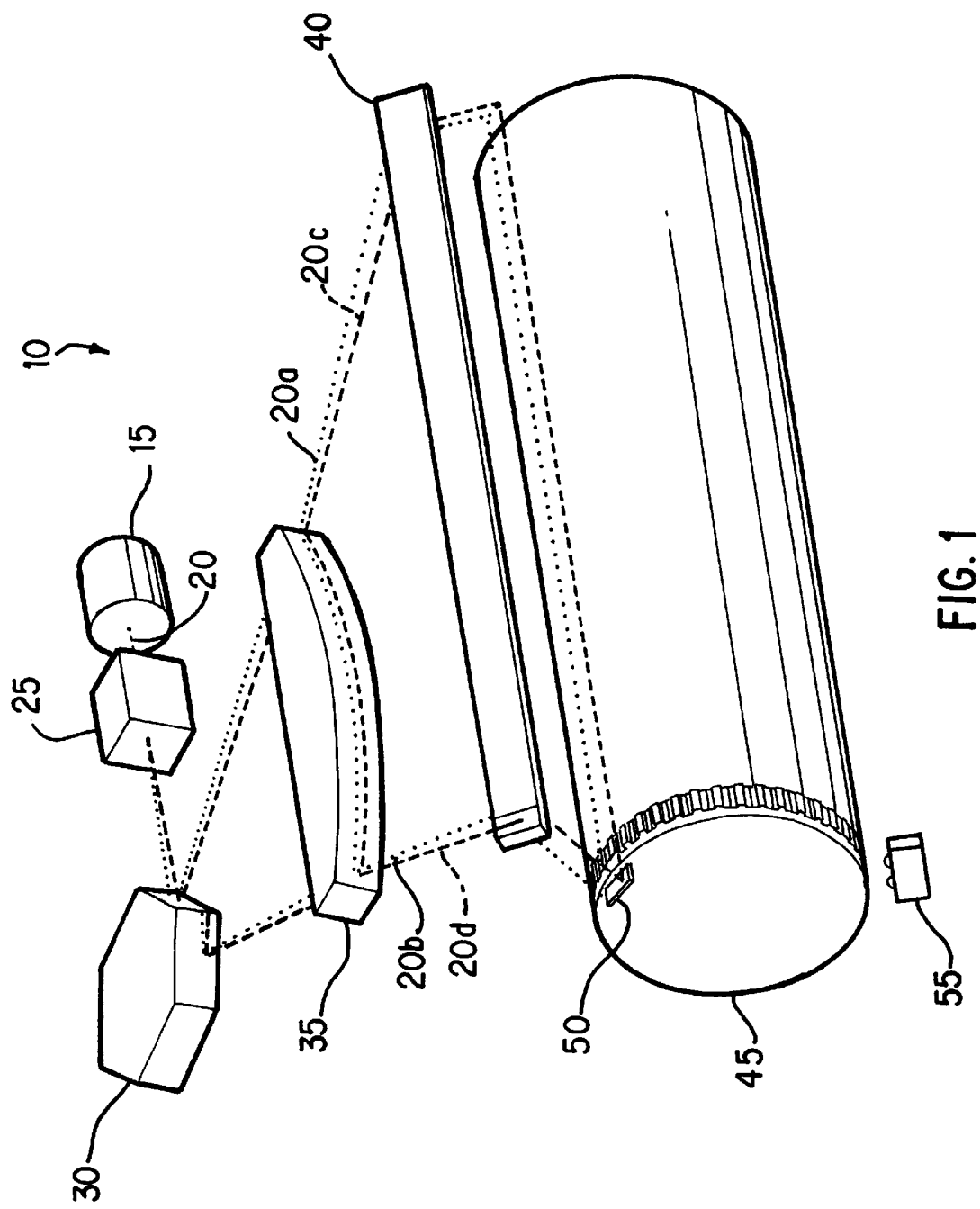
FIG. 1 is a schematic block diagram of the present invention system for providing a periodic trajectory scan path for a laser beam across an imaging surface in a laser printer.

FIG. 1 is a schematic block diagram of the present invention system 10 for providing a periodic trajectory scan path for a laser beam across an imaging surface (photoconductor) 45 in a laser printer. While the present invention is described for electro-photographic systems in which areas of photoconductor exposed to light attract toner to form the black or colored areas of an image, it will be obvious that the invention is equally suitable for electro-photographic systems in which unexposed areas of photoconductor attract toner while exposed areas do not attract toner and form the white spaces of the image. It will also be obvious that although the present invention is described for laser printers which create images by forming discreet dots in a rectilinear grid, the invention also applies to image-forming systems which have no such grid of "dots", but which form picture elements or marks of arbitrary length along the scan trajectory according to the requirements of the image being created.

Laser 15 directs laser beam 20 through beam deflector 25 which provides the beam deflecting capability necessary for the present invention. Beam deflector 25 may be a one-axis or a two-axis deflector (as determined in accordance with system design objectives). In the case of a two-axis deflector, an equivalent alternative is two one-axis deflectors (not shown) arranged in the laser beam path such that the resulting deflections are orthogonal, and all references herein to a two-axis beam deflector similarly apply to two orthogonally arranged one-axis deflectors.

Preferably, beam deflector 25 is located between laser 15 and polygon scanner 30 in order to limit the aperture size required in the deflector. Such a beam deflector can in principle be mechanical in nature, operating for example by mechanically translating the laser relative to its collection lens, or by tilting a beam steering mirror. Preferably, however, deflector 25 is an electro-optic (E-O) beam deflector which is well known in the art and provides an ideal combination of frequency response, deflection angle, deflection range, efficiency and flexibility of operation. Deflector 25 is controlled by print formatter 85 (FIG. 2) to maintain amplitude, frequency and phase relationships between deflection of the beam, modulation of laser 15, and rotation of polygon scanner 30.

Rotating polygon scanner 30 scans the beam through lens 35, across folding mirror 40 and across imaging surface (drum) 45. Although photoconductive drum 45 is shown, it will be obvious that other image forming and image transfer media, such as a continuous belt (not shown), could just as easily be used in place of drum 45.

Beams 20a and 20b are shown to demonstrate the endpoints of the path of beam 20 as it scans across drum 45 responsive to rotating polygon scanner 30. Beams 20c and 20d are shown to demonstrate the multiple beam paths provided by the periodic trajectory of the present invention. Deflector 25, in cooperation with rotating polygon scanning mirror 30, provides the periodic trajectory scan path across drum 45. The periodic trajectory scan in general traces out a curved path which may even be retrograde over some distances. However, by sampling this curved trajectory with appropriately timed laser beam modulation, the printer has access to a regular grid of locations on the drum at which to form dots. Specifically, rectilinear grids having uniform dot intervals in the primary grid directions, including rectangular grids with uniform dot spacing in the x (scan) and y (process) directions, are capable of being produced. Note that since the laser may or may not actually be modulated at any given grid location (depending on the requirements of the image being formed), grid locations are often referred to as "available dot locations" to emphasize that these are the locations where a dot is written if it is required for the image being formed. No dots are written at grid locations that fall within the white spaces of an image.

The periodic trajectory scan path provides for a plurality of generally linear rows of dots to be completed in a single scan pass of the laser beam across the drum surface to improve printing speed and/or image quality. Printing speed is improved because multiple rows of dots are formed in one scan pass, thus allowing drum 45 to be rotated faster without the need for rotating polygon scanner 30 any faster. Image quality is improved because banding can be corrected, either by applying a selected voltage offset to the E-O deflector during each scan pass (the preferred method), or by selectively adjusting the phase (timing) of laser modulation relative to the periodic trajectory scan path. Resolution may be enhanced either globally, by continuously deflecting the beam over a finer grid of available dot locations, or locally, by creating regions of higher resolution (e.g., at the edges of font characters).

Beam position detector 50 senses beam position relative to the drum in the scan direction, as conventional in the art, and may also be used in the present invention to sense beam position in the process direction for monitoring and controlling the positioning of the beam by deflector 25. Namely, detector 50 sends a signal back to y-axis correction circuit 90 (FIG. 2) indicating beam position in the process direction useful for correcting y-axis beam positioning errors.

Rotational error detector 55 may be used to detect rotational errors of drum 45 due to gear noise or other sources, and transmit a rotational position signal back to y-axis correction circuit 90 for banding correction purposes or the like. Together, drum position detector 55 and beam position detector 50 provide positioning information needed to provide accurate closed-loop control of beam placement on the drum.

Some of the benefits of the present invention system 10 for enhanced laser printer scanning include:

Increased resolution (dpi) in both scan and process directions.

Placement of dots between nominal grid locations in the process direction.

Improved design flexibility in optimizing image quality, speed, and manufacturing cost.

Closed-loop correction of banding errors without making fine mechanical corrections to the drum position.

Higher printing speeds without increased polygon scanner speed.

The opportunity for designers and users to make trade-offs between resolution and speed.

The ability to add periodic trajectory scanning capability to existing laser printer designs with minimum modification to those designs.

Better price/performance ratios for products in the marketplace.

Figure 2:
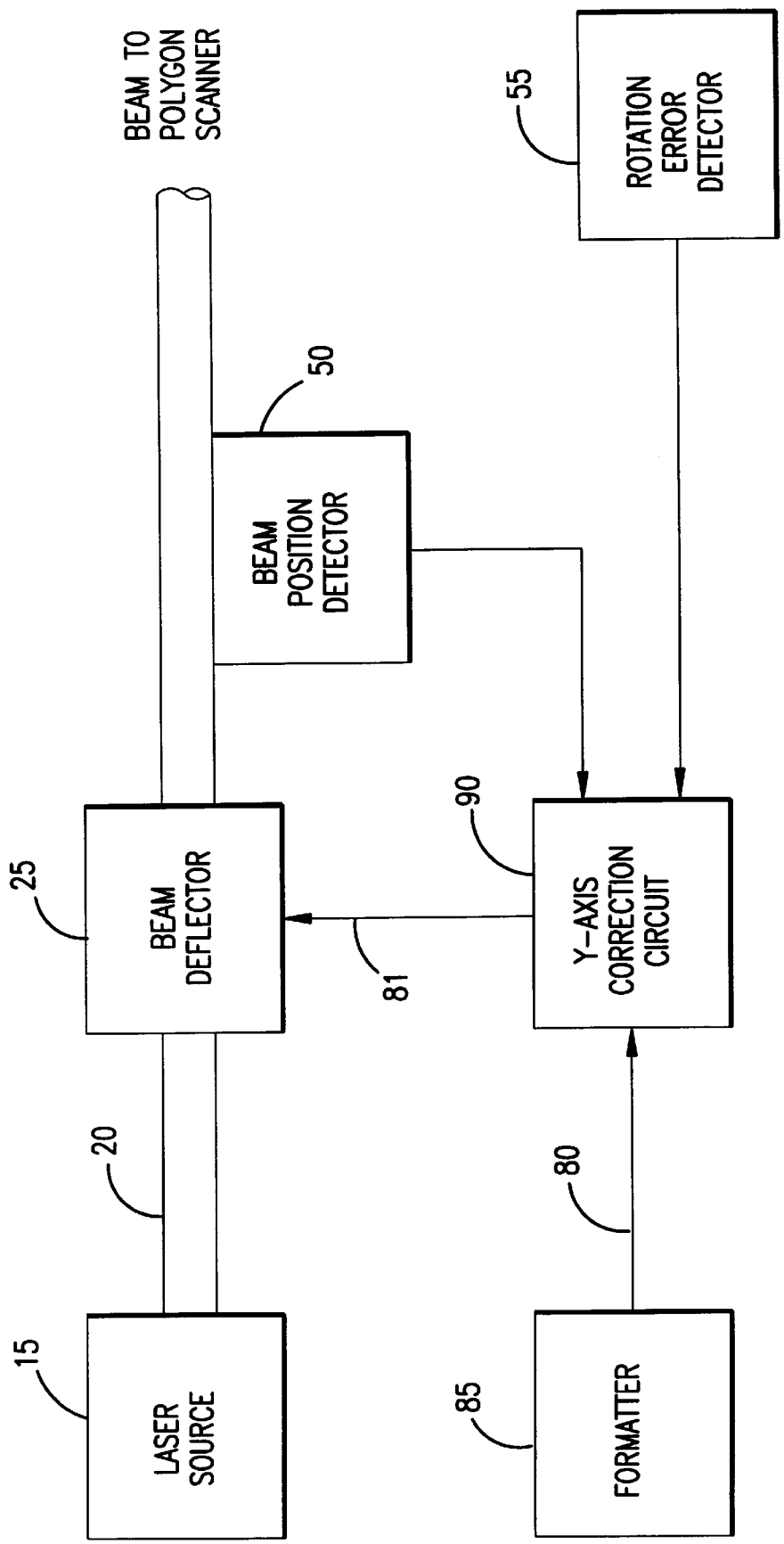
FIG. 2 is a schematic control block diagram showing signal paths of the present invention.

Referring now to FIG. 2, a schematic control block diagram shows signal paths of the present invention. Note that like components retain like references throughout all of the Figures.

Laser 15 is shown projecting beam 20 through beam deflector 25, to beam position detector 50. Y-axis correction circuit 90 receives signal 80 from print formatter 85 as well as signals from beam position detector 50 and drum rotation error detector 55, all of which are used to produce signal 81 which drives beam deflector 25. Y-axis correction circuit 90 provides closed-loop y-axis control of beam deflector 25, thus controlling dot placement for banding correction and the like.

Figure 3:
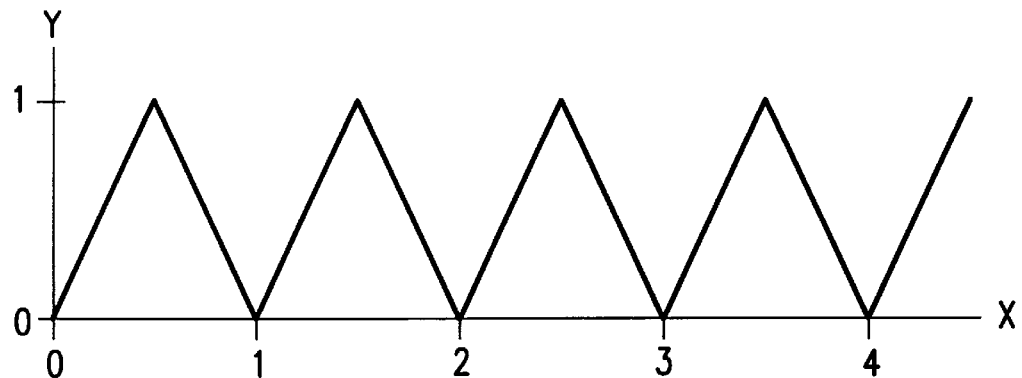
FIG. 3 is a diagram of a periodic trajectory scan path having a triangle wave shape according to the present invention.
Figure 4:
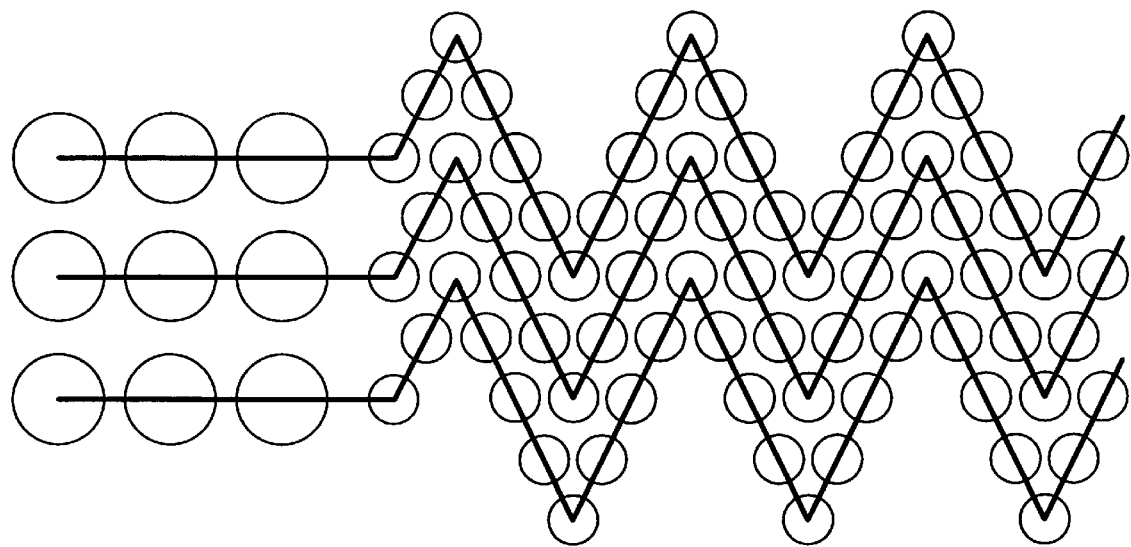
FIG. 4 is a diagram of a parallelogram grid of dots produced by modulating the laser beam at selected locations in the triangle wave periodic trajectory scan path of FIG. 3.

A straightforward and relatively inexpensive implementation of beam deflector 25 uses a one-axis E-O deflector aligned to produce beam motion in the y (process) direction on the drum. A preferred embodiment periodic trajectory scan path for a system which utilizes this simple deflector configuration produces a "triangle wave" periodic trajectory as illustrated in FIG. 3. Beam motion in the y direction (provided by the beam deflector) having constant velocity but alternating direction is combined with constant velocity beam motion in the x direction (provided by the polygon scanner) to produce a triangle wave trajectory consisting of a series of straight segments angled with respect to the x and y directions as the name implies. A peak or valley is formed in the triangle wave trajectory each time the beam deflector changes direction. A rectilinear grid of available dot locations, in this case a parallelogram grid, is formed as illustrated by the example in FIG. 4. Example grid locations available for laser modulation are marked with "○" symbols. As is well understood in the electro-photographic (EP) art, these "dots" are not truly round, but are represented as such in all of the drawings for ease of description. For comparison, the coarser square grid at the left of the Figure illustrates the base resolution of the printer without periodic trajectory scanning. Note that, in this example, the resolution (dpi) in both x and y directions is doubled with no increase in page rate. The laser modulation frequency required to produce the grid of FIG. 4 is 8 times the fundamental deflector frequency. Parameter values for producing this example trajectory are as follows:

$$f = 1 \qquad v = 1 \qquad A = 1 \qquad x(t) = vt$$

During $1^{st}$ half of each deflection cycle:
$y(t)=2Af\tau \quad 0<\tau<1/(2f)$ During $2^{nd}$ half of each deflection cycle:
$y(t)=2A(1-f\tau) \quad 1/(2f)<\tau<1/f$ Times at which laser is modulated: $\tau$=0, 1/8, 2/8, 3/8, 4/8, 5,8, 6/8, and 7/8.

Deflector phase at which laser is modulated: 0, $\pi/4$, $2\pi/4$, $3\pi/4$, $4\pi/4$, . . .

Laser modulation frequency=8 where
 f=deflection frequency
 v=velocity of the beam in the x direction due to the polygon scanner
 t=time
 $\tau$=time since the start of the current deflection cycle ($\tau$=t−n/f)
 A=deflection amplitude
 n=number of completed deflection cycles since t=0 (n=0, 1, 2, 3, . . . )

It should be noted that the triangle wave beam trajectory need not be constructed of perfectly straight segments to make this technique work, as long as the laser is modulated at locations along the beam path which conform to the desired grid. Such a departure from strict linearity may be beneficial for reducing the bandwidth required of the beam deflector and its associated drive circuitry. A sinusoidal signal with higher harmonic frequencies added is one method for approximating the present triangle wave periodic trajectory scan path, and deriving the benefits thereof, while reducing the required bandwidth of the beam deflector.

While the triangle wave periodic trajectory has many positive attributes, including the ability to use a very simple hardware configuration, it does not provide all of the benefits that can be obtained from periodic trajectory scanning, and has some drawbacks. Specific limitations of the triangle wave method include:

Some dots are written at the peaks and valleys of the triangle wave where the deflector changes direction, momentarily reducing the speed of the beam on the drum and affecting the parameters of dot formation.

Dots are written in multiple partially-completed rows during each scan pass, requiring greater uniformity of polygon scanner speed than other methods to accurately position adjacent "interlaced" rows of dots in succeeding scan passes.

Fewer rows of dots are fully completed per scan pass than in other methods. In the example of FIG. 4, dots are written in 5 different rows but only two of these rows are actually completed during each scan pass of the beam across the drum and, in this example, no increase in page rate is achieved.

The non-rectangular (parallelogram) grid produced by this method requires a different dot mapping for printed characters than conventional rectangular grids.

Printing with interleaved scan lines (which require more than one scan pass to form each row of dots) requires increased formatter complexity.

While most of these problems can be resolved, the design trade-offs between cost and performance may favor other periodic trajectories with improved performance.

Figure 5:
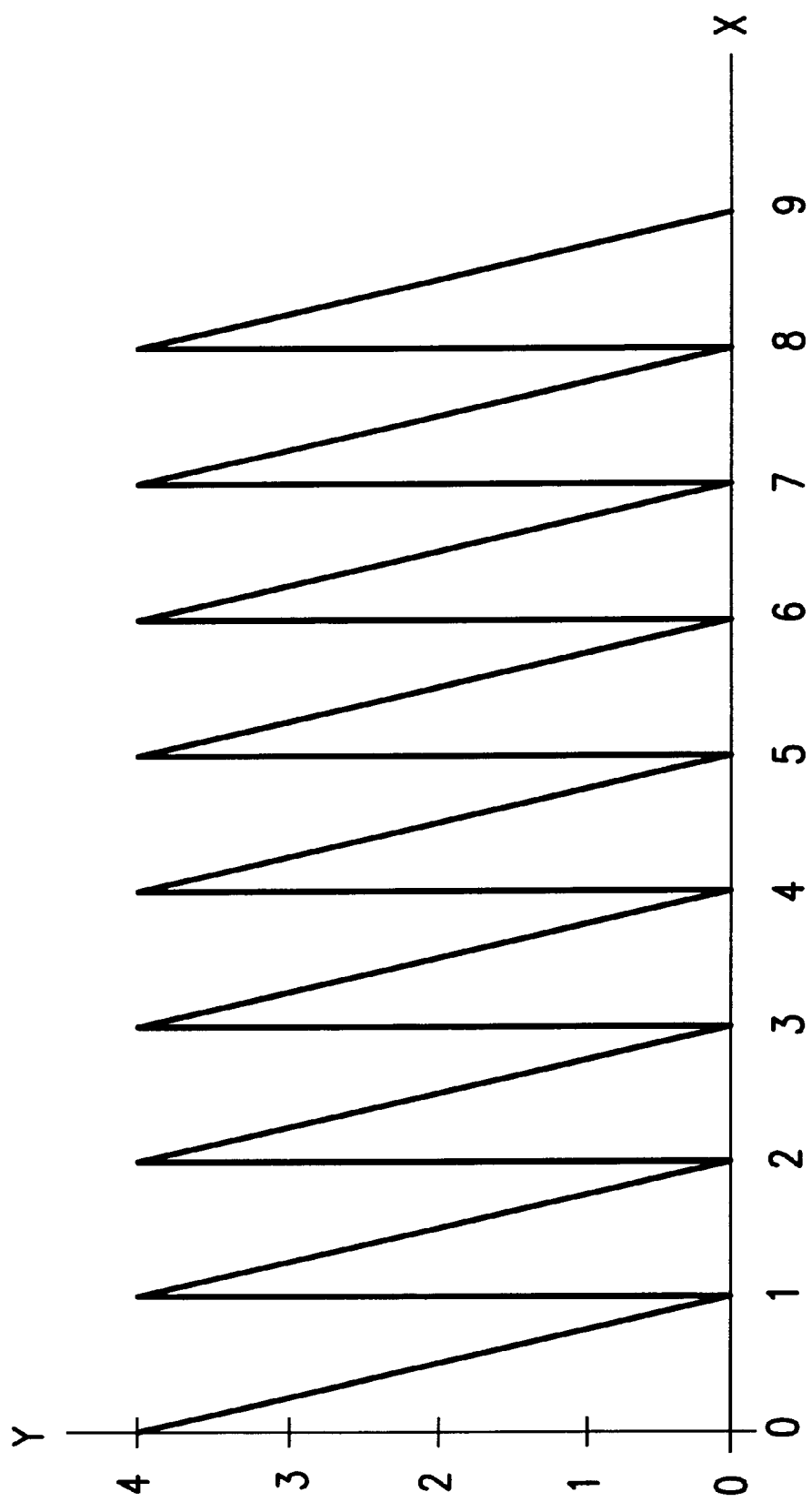
FIG. 5 is a diagram of a periodic trajectory scan path having a sawtooth wave shape according to the present invention.
Figure 6:
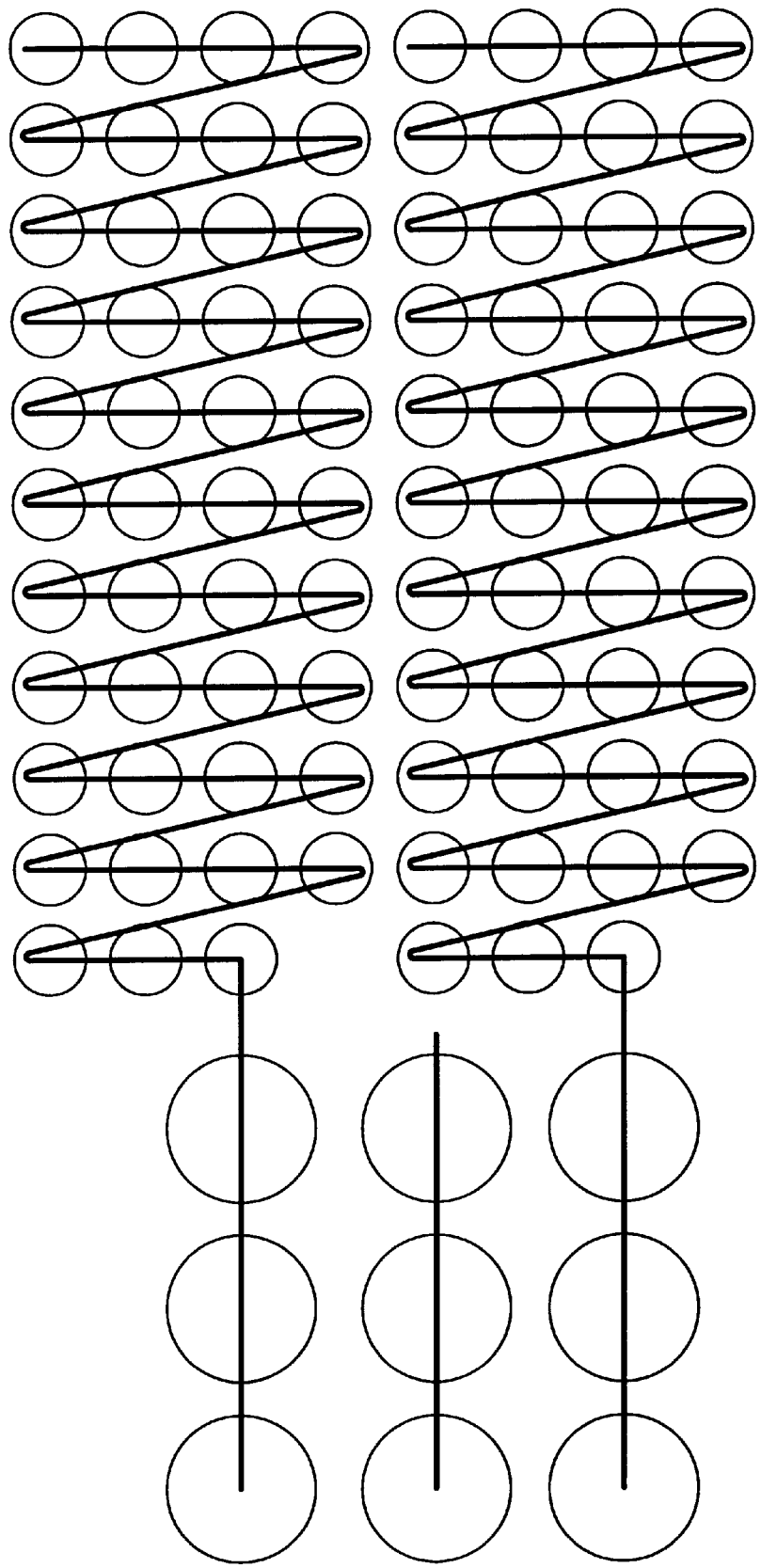
FIG. 6 is a diagram of a rectangular grid of dots produced by modulating the laser beam at selected locations in the sawtooth wave periodic trajectory scan path of FIG. 5.

Increased functionality can be obtained from a laser printer with a one-axis beam deflector by aligning the deflector to produce beam motion in a direction intermediate between the scan and process directions. A preferred embodiment periodic trajectory scan path which can be produced by a one-axis beam deflector aligned in such an intermediate direction produces a "sawtooth wave" as shown in FIG. 5. The combined beam motions provided by the beam deflector and the polygon scanner create a periodic trajectory scan path in which the beam moves substantially in the y direction during a portion of each deflection cycle (during which the laser may be modulated and dots may be written), and then returns along an angled path during the remainder of each deflection cycle (during which the laser is not modulated and no dots are written). As shown in FIG. 6, the resulting sawtooth wave periodic trajectory scan path is capable of efficiently producing multiple completed rows of dots during each scan pass while producing a rectangular grid of available dot locations.

Momentarily disregarding beam motion due to the polygon scanner and only considering motion due to the beam deflector, the deflector is rotationally aligned to produce beam motion on the drum along a path which is rotated by an angle $\theta$ with respect to the y direction. Since the magnitude of $\theta$ is between 0° and 90°, the beam has a component of motion in both x (scan) and y (process) directions as the deflector responds to applied signals. Namely, a beam which is deflected through a distance A (along the rotated path) moves a distance A sin $\theta$ in the x direction and A cos $\theta$ in the y direction. Since x and y beam positions are simply these x and y components of the beam position along the rotated path, x and y motions have the same frequency and phase, and have constant amplitude and velocity ratios (equal to tan $\theta$), without the need for a two-axis deflector to separately control x and y motions.

Reintroducing beam motion in the x direction due to polygon scanning, alignment angle $\theta$ and the beam deflection velocity are chosen such that the x component of beam deflection velocity substantially cancels beam velocity in the x direction due to polygon scanning and the beam has little or no resulting velocity in the x direction during a significant portion of each deflection cycle. During this portion of each cycle, the beam moves substantially only in the y direction, forming dots in a rectangular grid as needed to produce the desired image. Again, example grid locations available for laser modulation are marked with "○" symbols in FIG. 6. For comparison, the coarser grid at the left of the Figure illustrates the base resolution of the printer without periodic trajectory scanning. Since four rows of dots are written per scan pass in this example, the resolution (dpi) in both x and y directions is doubled while also doubling the page rate of the printer.

The periodic signal applied to the beam deflector to produce the sawtooth wave trajectory is similar to that which produced the triangle wave trajectory described with reference to FIG. 3. Namely, one ascending and one descending voltage ramp during each deflection cycle. The parameter values for producing the example sawtooth wave periodic trajectory of FIG. 5 are as follows:

$$f = 1 \quad v = 1 \quad \theta = 7.125°$$
$$A_\theta = 4.0311 \quad A_y = A\cos\theta = 4 \quad A_x A \sin\theta = 0.5$$

During $1^{st}$ half of each deflection cycle: $0 < \tau < 1/(2f)$
  $x(t) = vt - 2A_x f\tau$
  $y(t) = 2A_y f\tau$
During $2^{nd}$ half of each deflection cycle: $1/(2f) < \tau < 1/f$
  $x(t) = vt + 2A_x(f\tau - 1)$
  $y(t) = 2A_y(1 - f\tau)$
Times at which laser is modulated: t=1/16, 3/16, 5/16, 7/16
Deflector phases at which laser is modulated: π/8, 3π/8, 5π/8, 7π/8
Laser modulation frequency=8 (instantaneous), 4 (average)
where
  θ=Rotational alignment angle of beam deflector (Measured from y-axis.)
  $A_\theta$=Deflection amplitude along rotated path
  $A_x$=Deflection amplitude in the x direction
  $A_y$=Deflection amplitude in the y direction
  Other variables are as previously defined.
Some of the potential benefits of the sawtooth wave method are as follows:
  Requires only a one-axis deflector and one deflector drive circuit.
  The method is simple and robust.
  Not limited to producing a specific number of rows of dots per scan pass.
  Efficient in terms of rows of dots completed per scan pass.
  A rectangular grid can be produced.
  All dots are written at the same beam speed relative to the drum.
Limitations of the sawtooth wave method include:
  Optical implementation may be more complex than for triangle wave method due to the need to rotate beam polarization to align with the rotated deflector.
  The time required for the beam return portion of each trajectory cycle is not used for dot writing. The method may therefore be less efficient in terms of dots per deflection cycle than other methods, or equivalently, it may require a higher deflection frequency to achieve the same number of dots per cycle as other methods.
  Dot spacing in the scan direction is determined in part by the angular alignment of the beam deflector and cannot be controlled by software alone.
  Attempts to correct banding by applying voltage offsets to the beam deflector cause undesired x-direction shifts along with the desired y-direction shifts. Practical banding correction may thus be limited to methods which control the timing of dot formation.

Because practical systems would limit the highest frequency components used to drive the beam deflector, the dot placement geometry of FIG. 6 requires no dots to be located at the extreme tops or bottoms of the "teeth" where the deflector reverses direction. This permits the sawtooth trajectory to have rounded "teeth" without compromising dot location. This geometry yields significant benefits by reducing the necessary deflector bandwidth and permitting all dots to be written at the same beam speed relative to the drum.

Since dot writing occurs only during the process-direction portion of each deflection cycle, the return or retrace portion of the cycle (in which no writing occurs) need not be even approximately linear, but may be optimized in shape to provide faster return of the deflected beam. It should also be noted that the beam trajectory need not be constructed of straight line segments to make this technique work, as long as some sizable portion of the deflection vs. time curve is substantially linear, or as long as the beam trajectory is sampled by laser modulation at locations which conform to the desired grid. Such a departure from straight lines and sharp corners is desirable for reducing the bandwidth of the signal needed to drive the beam deflector. Note that many variations of this sawtooth periodic trajectory are possible, including those in which writing occurs along a portion of trajectory which is not aligned in the y direction.

Although the present sawtooth trajectory could also be produced by a two-axis deflector configured to provide x and y deflections with the same frequency and phase, and with proper amplitudes, the more efficient and economical (hence preferred) method for producing the sawtooth trajectory, is with the rotationally aligned one-axis deflector described here.

Figure 7:
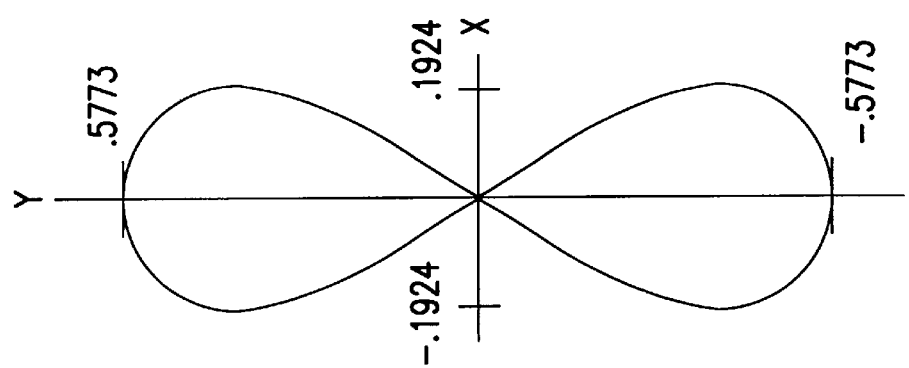
FIG. 7 is a diagram of a "figure-8" Lissajous curve produced by x and y deflections of a two-axis deflector in the absence of beam motion due to the polygon scanner.
Figure 8:
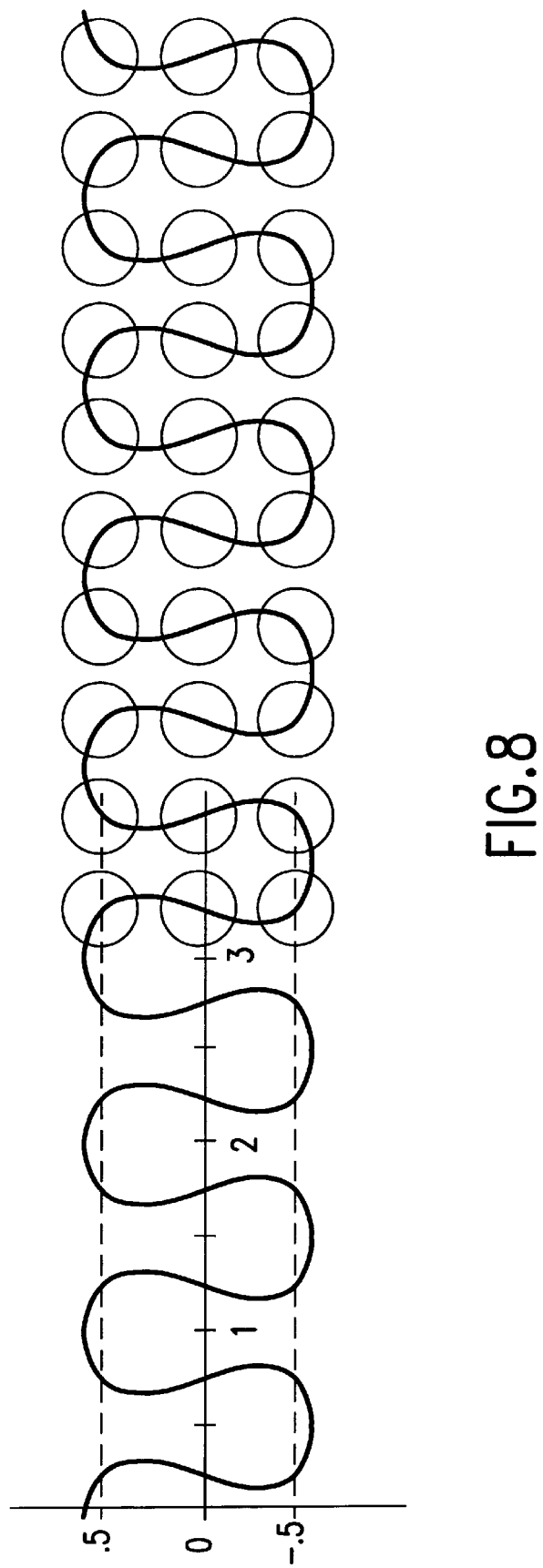
FIG. 8 is a diagram of a Lissajous wave periodic trajectory scan path having an omega wave shape produced by the "figure-8" beam deflection of FIG. 7.

Two-axis deflectors are, however, capable of producing periodic trajectories that cannot be duplicated with one-axis deflectors and which afford greater design control of the spatial and temporal profiles of the beam's trajectory. Referring now to FIG. 7, beam deflector 25 (of FIG. 1) is now a two-axis deflector with driving frequencies and amplitudes separately selected for x (scan) and y (process) directions such that a Lissajous curve, such as the "figure-8" curve shown in FIG. 7, is produced in the absence of beam motion due to the polygon scanner. When beam deflection forming a Lissajous curve is combined with the constant velocity sweep of the beam due to polygon scanner 30 (of FIG. 1) a periodic trajectory scan path, referred to herein as a "Lissajous wave", is formed. FIG. 8 shows a Lissajous wave produced from the Lissajous curve of FIG. 7. The example Lissajous wave of FIG. 8 is called an "omega wave", named for the alternating series of upright and inverted omega shaped curves which form the trajectory.

The graphed omega wave trajectory of FIG. 8 shows a grid of available dot positions marked with the "○" symbol at equal time (phase) intervals. In this example, the laser modulation frequency is 6 times the deflector frequency in the y direction. Parameter values for producing the example "figure-8" Lissajous curve of FIG. 7 and the resulting omega wave trajectory of FIG. 8 are as follows:

$$f_x = 2 \quad f_y = 1 \quad v = 1$$

$$A_x = .1924 \quad A_y = .5773$$

$$x(t) = A_x \sin(2\pi f_x t) + vt \quad y(t) A_y \cos(2\pi f_y t)$$

Times at which laser is modulated: t=1/12, 3/12, 5/12, 7/12, 9/12, 11/12
Deflector phases at which laser is modulated: π/6, 3π/6, 5π/6, 7π/6, 9π/6, 11π/6
Laser modulation frequency=6
where
$f_x$=deflection frequency in the x direction
$f_y$=deflection frequency in the y direction
Other variables are as previously defined.
The amplitude $A_x$ was determined by finding the value of $A_x$ for which the three desired dot locations line up in the vertical direction by setting x(1/12) equal to x(3/12). Which results in:

$$A_x = \frac{\frac{1}{6}}{\sin\left(\frac{\pi}{3}\right)} \qquad A_x = .1924$$

Figure 9:
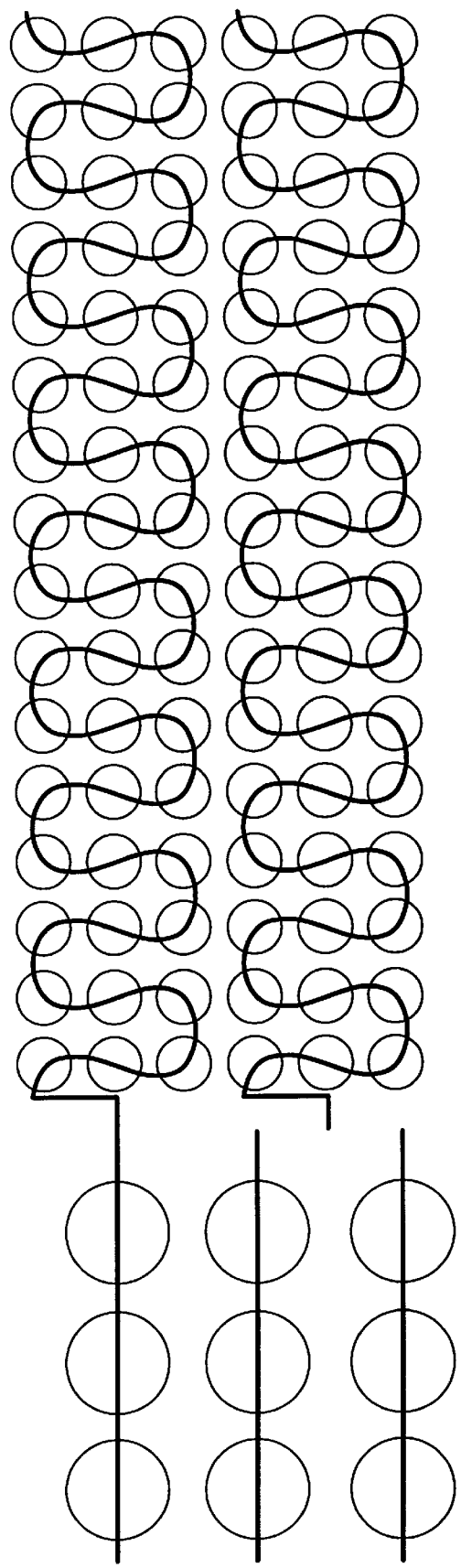
FIG. 9 is a diagram of a rectangular grid of dots produced by sampling the omega wave periodic trajectory scan path of FIG. 8 at selected locations.

Symmetry assures that all successive triplets of points will also be vertically aligned. The marked dot locations (depicted by the "◯" symbols) for the omega wave periodic trajectory of FIGS. 8 and 9 were determined by this method. The laser is turned on at π/3 intervals of phase, starting at π/6 in this example. As shown in FIG. 9, this results in a rectangular grid of available dot locations having uniform spacing in the x (scan) and y (process) directions, even though the x and y deflections of the beam are sinusoidal functions of time. Benefits of driving the beam deflector with these relatively low frequency signals include increased stability of operation and the ability to use an easily regulated low-noise signal generator. While the "◯" marks in FIGS. 8 and 9 are the locations of dots if laser modulation occurs at equal phase intervals of π/3, starting at π/6, other choices are possible, such as selectively adjusting the phase intervals for banding correction. For comparison, the coarser grid at the left of FIG. 9 illustrates the base resolution of the printer without periodic trajectory scanning. Since three rows of dots are written per scan pass in this example, printer resolution (dpi) in both x and y directions is doubled while the page rate is increased by a factor of 1.5.

Although the omega wave example of the Lissajous wave periodic trajectory presented with reference to FIGS. 7–9 utilizes separate single-frequency signals to drive x and y axes of the beam deflector, Lissajous wave trajectories are not limited to such single-frequency deflection signals. Lissajous wave periodic trajectories include all trajectories wherein, in the absence of beam motion due to the polygon scanner, separate x and y deflection signals cause the beam to repeatedly trace a closed path. Signals which separately control x and y motions in a Lissajous wave may consist of one or more than one frequency, as long as all such component frequencies, whether controlling x or y motions, are commensurable. Two frequencies are commensurable if their ratio forms a rational number. Driving one or both deflection axes with multi-frequency signals (which may include higher harmonic frequencies) provides greater design control of Lissajous wave trajectories, and may be used to increase the straightness of portions of the trajectory shape, to increase the uniformity of beam velocity along portions of the trajectory, or to provide other trajectory enhancements.

Figure 10:
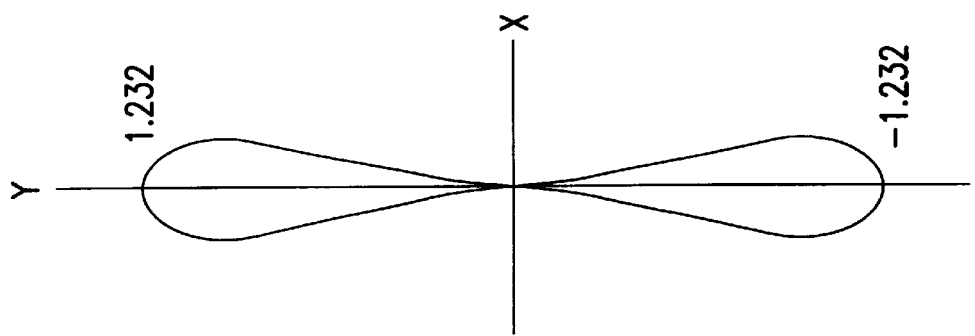
FIG. 10 is a diagram of an improved "figure-8" Lissajous curve produced by a two-axis deflector and enhanced by the addition of higher harmonic frequencies to both x and y deflections.

FIG. 10 is a diagram of an enhanced "figure-8" Lissajous curve produced by a two-axis deflector and improved by the addition of higher harmonic frequencies to both x and y deflection signals. FIG. 10 shows the beam path in the absence of beam motion due to the polygon scanner. In this example, a second harmonic was added to the x deflection signal and a third harmonic was added to the y deflection signal. A comparison of FIG. 10 with FIG. 7 illustrates the increased linearity that results from the added harmonic components. Greater uniformity of beam velocity is also achieved.

Figure 11A:
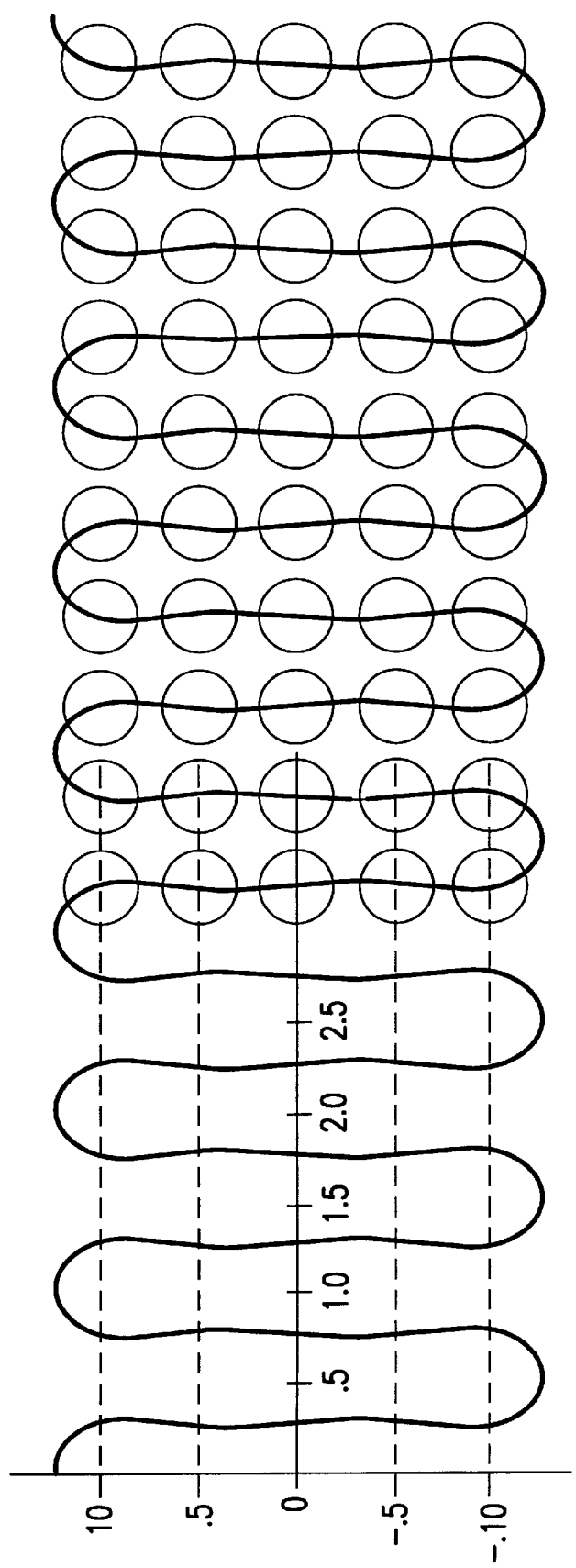
FIG. 11a is a plot of a multiple-frequency omega wave periodic trajectory produced by the multiple-frequency x and y deflection signals of FIG. 10.
Figure 11B:
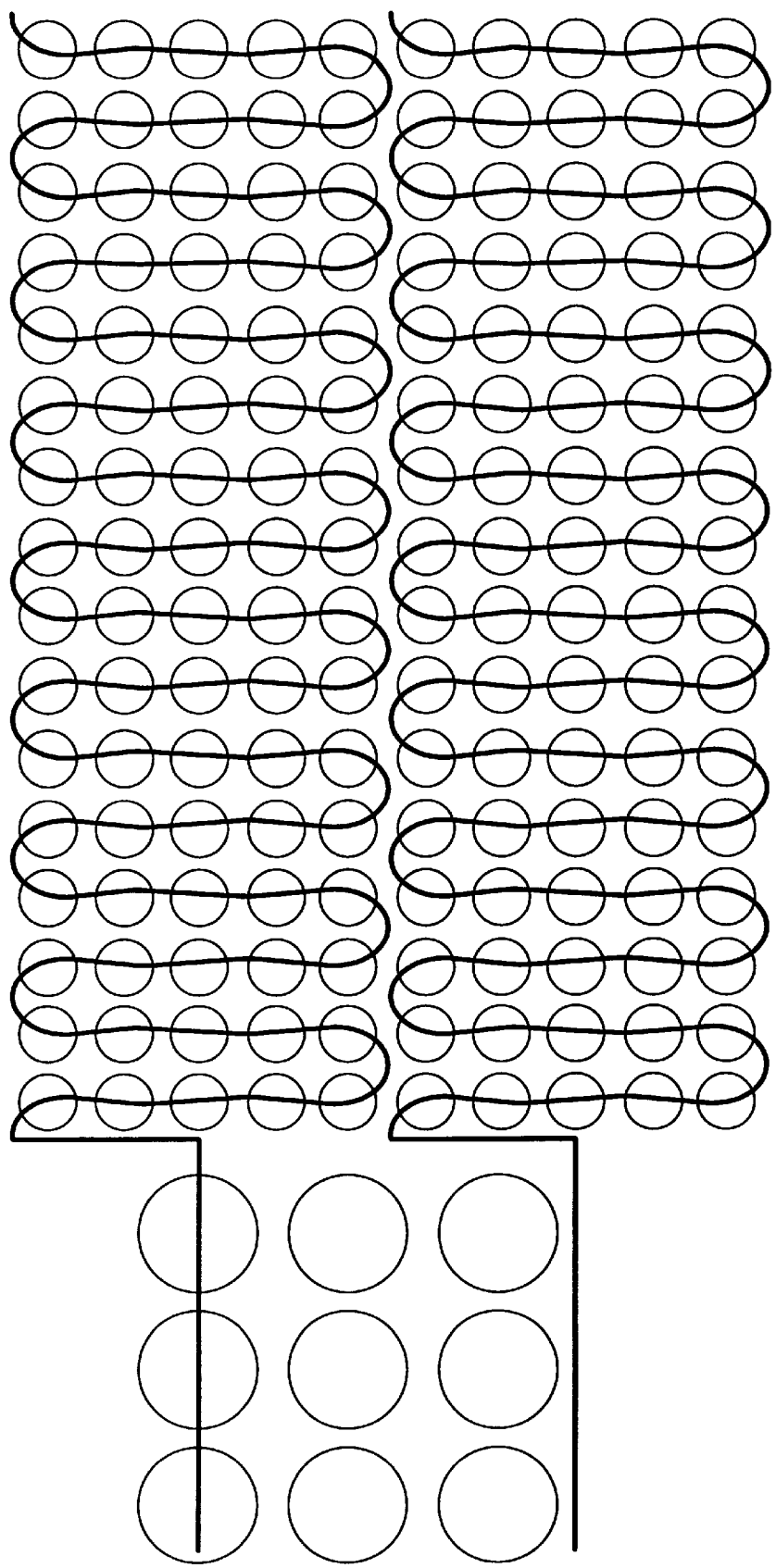
FIG. 11b is a diagram of a rectangular grid of dots produced by sampling the multiple-frequency omega wave periodic trajectory scan path of FIG. 11a at selected locations.

FIG. 11a illustrates a preferred embodiment periodic trajectory scan path for a system with a two-axis beam deflector operating independently in the scan and process directions according to the present invention. The multiple-frequency Lissajous curve of FIG. 10, when combined with the constant velocity sweep of polygon scanner 30 (FIG. 1), produces a Lissajous wave periodic trajectory which is an enhancement of the omega wave periodic trajectory of FIG. 8 and which is called the "multiple-frequency omega wave" periodic trajectory. Note that the multiple-frequency omega wave trajectory of FIG. 11a somewhat resembles a rectangle wave in shape, and that the differences between the two shapes can be made arbitrarily small with the addition of appropriate higher frequency components (although there is little motivation to actually do so, since achieving square corners provides no additional benefit but requires added cost and complexity). FIG. 11b shows two adjacent periodic trajectory scan paths forming a grid of dot locations at twice the base resolution of the printer (shown at left in the Figure for comparison). Since five rows of dots are written per scan pass in this example, printer resolution in both x and y directions is doubled and page rate is increased 2.5 times.

It should be emphasized that the particular multiple-frequency omega wave illustrated by FIGS. 10, 11a and 11b is but one of many possible configurations, and that although this example uses one added harmonic frequency for each deflection direction and provides for 10 dots to be written during each deflection cycle, other configurations might use differing numbers of frequencies and provide for differing numbers of dots per cycle. In addition to benefits derived from the previously disclosed omega wave trajectory, the multiple-frequency omega wave trajectory provides increased flexibility in positioning dots (such as for banding correction), the ability to form more dots per deflection cycle (such as for increased resolution), and the increased ability to add dots between grid locations (such as for edge resolution enhancement).

Although the preferred embodiment multiple-frequency omega wave periodic trajectory may superficially resemble a rectangle wave trajectory produced by a simple one-axis beam deflector operating in the y direction alone, the multiple-frequency omega wave trajectory is significantly different and much preferred. It must be emphasized that the periodic trajectories of the present invention exist in both space and time, and cannot be properly evaluated on the basis of spatial geometry (shape) alone. The velocity of the beam along the trajectory, especially along those portions where dots are formed, must also be carefully considered. Lissajous wave periodic trajectories in general, and the present multiple-frequency omega wave trajectory in particular, incorporate beam deflection in the −x direction which offsets beam motion in the +x direction due to the polygon scanner during those portions of each deflection cycle during which dots are formed. As a consequence, the speed of the beam on the imaging surface and the frequency of laser modulation are comparatively low and constant during dot formation. In contrast, a one-axis beam deflector operating in the y direction and creating a superficially similar rectangle wave trajectory has no means for offsetting x direction beam motion (due to polygon scanning) and must provide full-amplitude y axis beam deflection in a small fraction of a deflection cycle. The deflector must therefore move at extremely high speed to form the portions of the trajectory aligned in the y direction during which dots are formed. This requirement for extreme speed places potentially unreasonable requirements on the beam deflector and the laser, as well the electronics that drive them. Such extreme deflection and dot writing speeds also work against the precise dot placement needed for increased resolution, banding correction, edge resolution enhancement, and the like.

Parameter values for producing the example multiple-frequency omega wave periodic trajectory of FIGS. 11a and 11b are as follows:

$$f_{1x} = 2 \quad A_{1x} = .14433$$
$$f_{2x} = 4 \quad A_{2x} = 0.48112$$
$$f_{1y} = 1 \quad A_{1y} = 1.1547$$
$$f_{3y} = 3 \quad A_{3y} = .07735$$
$$v = 1$$
$$x(t) = A_{1x}\sin(2\pi f_{1x}t) + A_{2x}\sin(2\pi f_{2x}t) + vt$$
$$y(t) = A_{1y}\cos(2\pi f_{1y}t) + A_{3y}\cos(2\pi f_{3y}t)$$

Times at which laser is modulated: t=1/12, 2,12, 3/12, 4/12, 5/12, 7/12, 8/12 . . . (laser is not modulated at t=0, 6/12, 12/12 . . . )

Deflector phases at which laser is modulated: π/6, 2π/6, 3π/6, 4π/6, 5π/6, 7π/6, 8π/6 . . . (laser is not modulated at 0, 6π/6, 12π/6 . . . )

Laser modulation frequency=10 pulses per deflection cycle. (Dot rate is 12 dots per cycle, with 2 dots omitted in each cycle.)

Where
$f_{1x}$=fundamental deflection frequency in the x direction
$A_{1x}$=Amplitude of fundamental frequency component in the x direction
$f_{2x}$=2nd harmonic deflection frequency in the x direction
$A_{2x}$=Amplitude of 2nd harmonic frequency component in the x direction
$f_{1y}$=fundamental deflection frequency in the y direction
$A_{1y}$=Amplitude of fundamental frequency component in the y direction
$f_{3y}$=3rd harmonic deflection frequency in the y direction
$A_{3y}$=Amplitude of 3rd harmonic frequency component in the y direction
Other variables are as previously defined.

The amplitudes $A_{1x}$ and $A_{2x}$ were determined by solving the equation:

$$x(t)=A_{1x} \sin(2\pi f_{1x}t)+A_{2x} \sin(2\pi f_{2x}t)+vt$$

simultaneously for x(1/12)=x(2/12)=x(3/2); thus ensuring that the five desired dot locations line up in the vertical direction. Since spacing in the vertical direction is as important as alignment, an additional frequency component was added to the deflection in the y direction; in this case a third harmonic (having a frequency three times the fundamental). The amplitudes $A_1y$ and $A_{3y}$ were determined by solving the equation:

$$y(t)=A_{1y} \cos(2\pi f_{1y}t)+A_{3y} \cos(2\pi f_{3y}t)$$

simultaneously for y(1/12)=1 and y(2/12)=0.5; thus ensuring a vertical grid spacing of 0.5.

Some of the potential benefits of the multiple-frequency omega wave periodic trajectory, which are shared to a greater or lesser extent with other Lissajous wave trajectories, are as follows:

Access to a rectangular grid of dot locations without requiring excessively high frequency response from the beam deflector or other system components.

A rectangular grid with separately scalable x and y grid spacings.

Improved printing speed and image resolution without increasing polygon speed.

Constant spacing between dots produced at equal time intervals.

User selectable trade-offs between resolution and printing speed are possible.

Choice of applying a low frequency offset voltage to the beam deflector or adjusting the timing of laser pulsing to eliminate banding.

High scan efficiency in terms of dots completed per trajectory cycle and rows completed per scan pass.

Although Lissajous wave periodic trajectory scanning methods are described herein by reference to beam deflections in the x and y directions and by reference to example trajectories which approximate rectangle wave shapes, it will be obvious that many other variations are possible which make use of beam deflections not aligned in the x and y directions and/or which produce trajectories which do not approximate rectangle wave shapes.

Although FIGS. 3–4, 5–6 and 10–11 depict three preferred embodiments of the periodic trajectory scan path of the present invention (namely, the triangle wave, sawtooth wave and multiple-frequency omega wave periodic trajectory methods) for three beam deflector configurations, it is worth repeating that these methods are only three solutions in a design space whose variables include x and y amplitude, phase and frequency content, laser modulation timing, and drum rotation speed. As such, it should be noted that other methods may work.

For example, one method of dot placement is simply to drive beam deflector 25 in the y direction with a fast rise-time electrical waveform to place dots at desired locations in the immediate vicinity of the nominal scan path produced by polygon scanner 30. This "random access" method is suitable for gradually varying dot positions along a row of dots (such as for banding correction), or for more rapidly varying dot positions (such as for "beam borrowing" as disclosed in the previously referenced Lawton application). However, this random access method is poorly suited for creating multiple rows of dots during each scan pass, due to the exceptional, and possibly unrealizable, performance required from the beam deflector as measured by rise and settle time. There are also problems associated with power dissipation, software and hardware complexity, cost, electrical noise and electro-photographic process control associated with random access dot placement techniques, especially in the higher performance printers.

Accordingly, the periodic trajectory scanning methods of the present invention, especially the preferred methods depicted in FIGS. 3–4, 5–6 and 10–11, provide greatly enhanced dot placement flexibility with minimum required beam deflector bandwidth.

Figure 12:
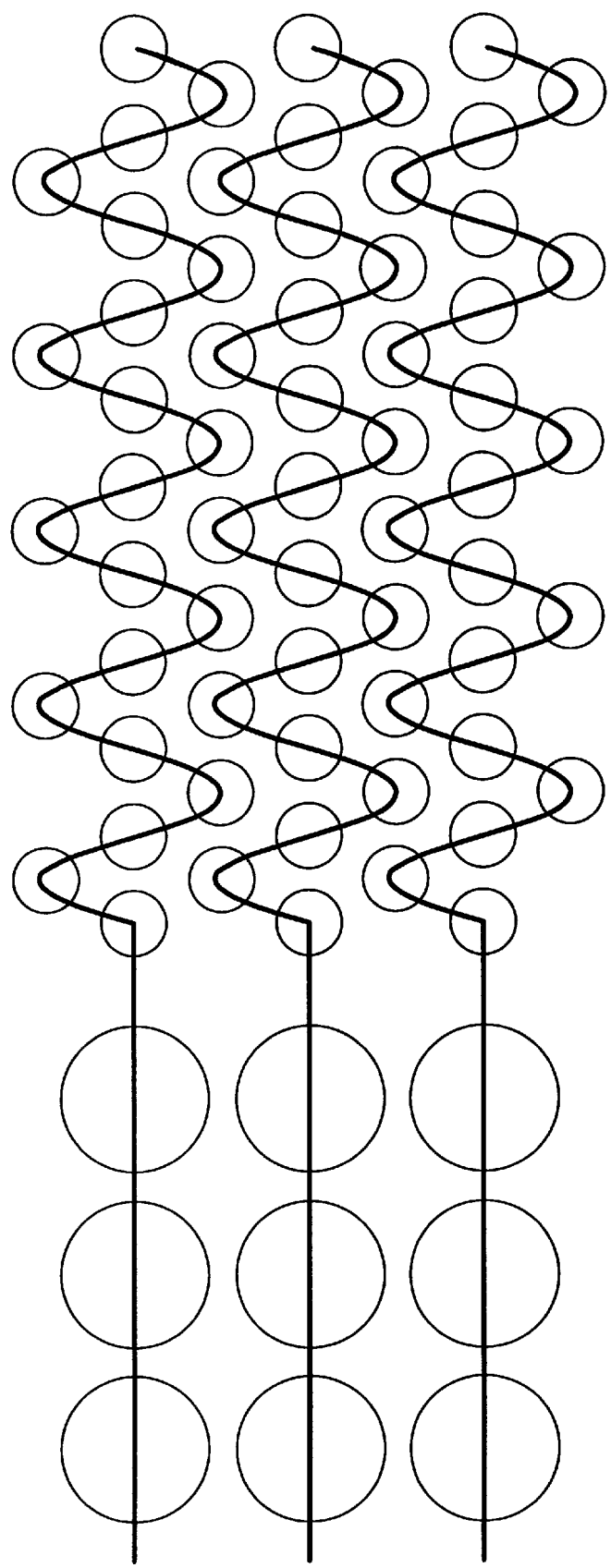
FIG. 12 is a diagram of an alternative embodiment sinusoidal wave periodic trajectory scan path showing a parallelogram grid of dot locations.

Although it is not the intent of this disclosure to address all potential waveforms or beam trajectories capable of improving dot placement and scanning according to principles of the present invention, FIG. 12 depicts an example of an alternative embodiment periodic trajectory that can be used.

FIG. 12 shows an alternative method of dot placement based on driving beam deflector 25 in the y direction with a sinusoidally varying voltage at a single frequency equal to ¼th the laser modulation frequency to produce a sinusoidal wave periodic trajectory. FIG. 12 further illustrates a method for producing a rectilinear grid of dot locations by modulating the laser at π/2 intervals of the phase of the beam deflector. As in previous plots, "○" marks indicate locations available for laser modulation to produce a grid of dots for image formation. The coarser grid in FIG. 12, shown for comparison, illustrates the base resolution of the printer without periodic trajectory scanning. In this example, a doubling of resolution is achieved in both x and y directions without a change in the page rate of the printer. The parameter values for producing the example trajectory of FIG. 12 are:

$$f_y = 1 \quad A_y = 1 \quad v = 1$$
$$x(t) = vt \quad y(t) = A_y \cos(2\pi f_y t)$$

Times at which laser is modulated: t=0, 1/4, 1/2, 3/4, 1 . . .

Laser modulation frequency=4

Figure 13:
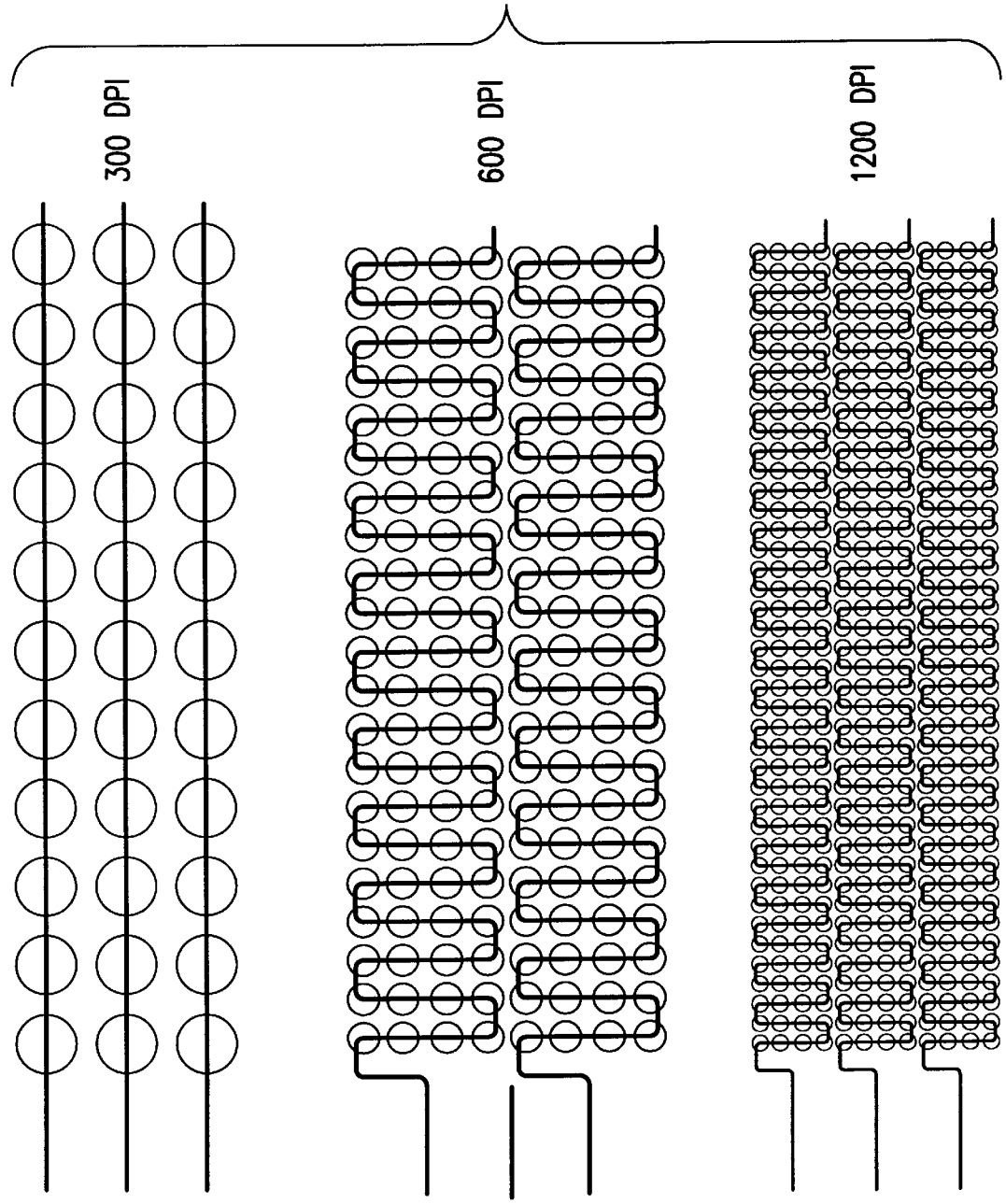
FIG. 13 shows examples of differing resolution modes and multiple rows of dots per scan pass attainable with the present invention periodic trajectory scan path.

The enhanced scanning techniques of the present invention and, more particularly, the preferred methods of FIGS. 3–4, 5–6 and 10–11, provide flexibility to developers of laser printers to trade off speed, image quality, and equipment cost; and provide the convenience of a single hardware platform on which to experiment. For example, periodic trajectory scanning can be used to increase printing speed by processing multiple conventional rows of dots with a single scan pass of the laser beam across the drum surface. Obviously, since multiple rows of dots are scanned in one pass, the drum can be rotated faster to accommodate the rows of dots being processed, thereby providing significantly increased printer output speed without increasing the rotation speed of the polygon mirror. The additional design flexibility provided by the enhanced scanning techniques of the present invention may be used to increase the options available to printer users, for example, the option to switch between low and high resolution print modes. The circuitry to provide two or three waveforms required for different trajectories (hence different resolutions) is minimal. FIG. 13 shows samples of trajectories using the multiple-frequency omega method to produce printed output at differing resolutions. The Figure also shows how multiple rows of dots are produced in one scan pass.

Edge resolution enhancement is another use of the periodic trajectory scanning of the present invention. Edge resolution enhancement is a method for imaging all "edges" of an image at higher resolution than the base resolution of the printer. An "edge" of an image or character is defined as the boundary between an area that is charged to attract toner and an area that does not attract toner and remains white.

Figure 14:
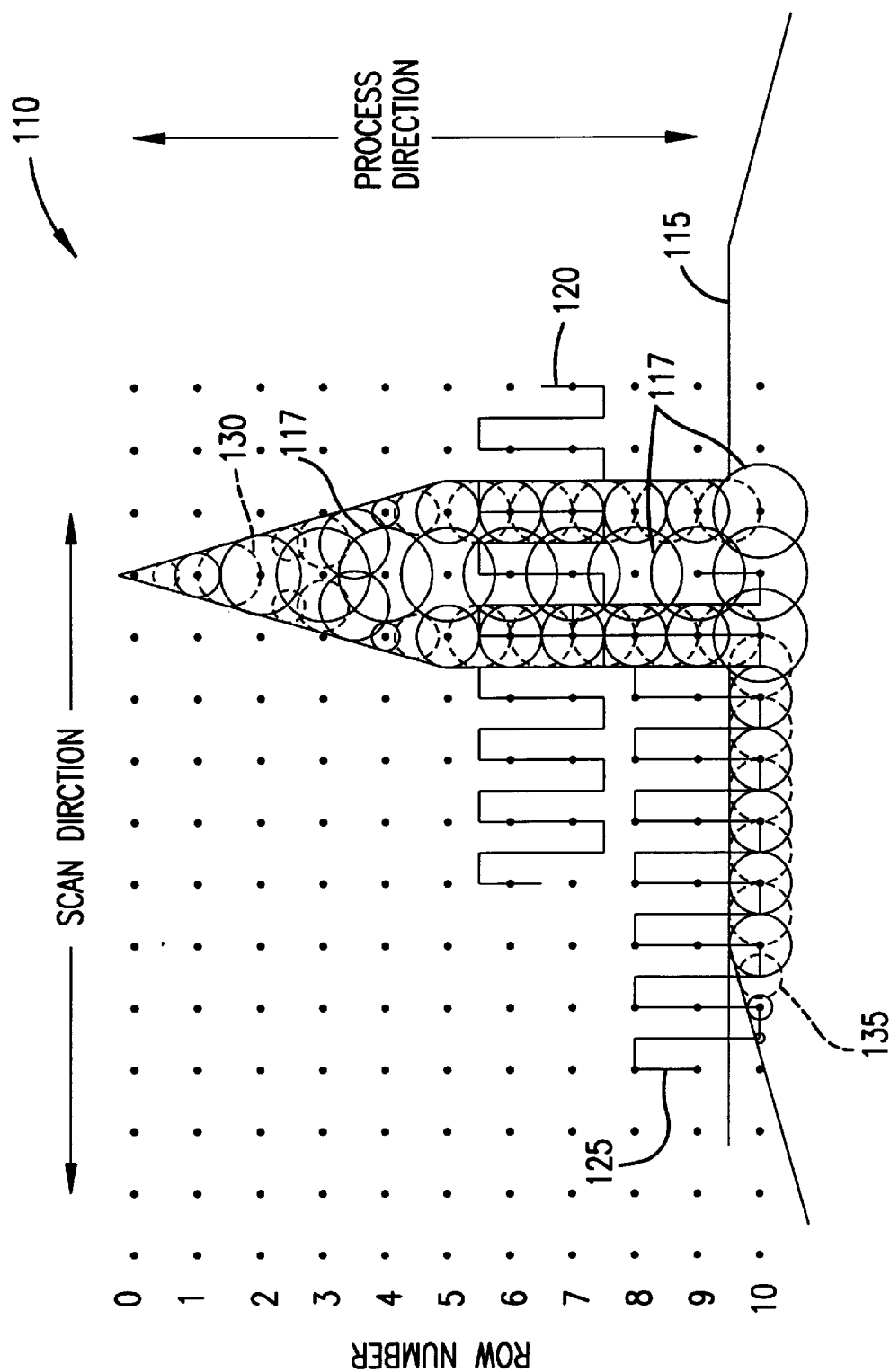
FIG. 14 is a magnified portion of a wingding "pplus" symbol, partially imaged, showing the periodic trajectory scanning method of the present invention used to increase resolution at the edges of the image.

FIG. 14 shows a top portion of a wingding "pplus" symbol 110 partially imaged and enlarged, showing conventional 300 dpi technology and gray scale in combination with edge resolution enhancement and the novel periodic trajectory scanning method of the present invention to increase resolution at the edges of the image by a factor of 2 in both x and y directions. Outline 115 shows the desired pattern for "pplus" symbol 110. Each dot 117 represents an area exposed to a laser pulse and to which toner is attracted. The dots fill in desired pattern 115 and form the "pplus" symbol as actually printed. Dot diameter is controlled by adjusting laser modulation pulse width. Variations in the dot diameters represent gray scale levels.

The grid is shown for visual clarification in identifying the imaging steps for the "pplus" symbol, for identifying base resolution, i.e., the locations where a dot could be placed using conventional 300 dpi technology, and for showing the multiple conventional rows of dots processed under the present invention periodic trajectory scanning technique. The process direction (y) and the scan direction (x) are labeled on the drawing.

Edge resolution enhancement takes advantage of the periodic trajectory scanning of the present invention to place dots at locations between the grid points of the 300 dpi grid in this example to produce a 2× resolution enhancement at the edges of an image. As is conventional in the art, a memory map contains the dot locations which define the image.

The present invention periodic trajectory scanning provides a method for implementing edge resolution enhancement. For example, FIG. 14 demonstrates how the edges of the "pplus" symbol are resolution doubled from 300 dpi gray scale resolution to 600 dpi gray scale resolution using edge resolution enhancement, gray scale, and periodic trajectory scanning.

FIG. 14 shows the printing of dot rows zero (0) through ten (10) of "pplus" 110, although for clarity of depiction, only two exemplary periodic trajectory scan paths 120 and 125 are shown, and only additional dots 130 and 135 (shown in broken dash line) are reference labeled, i.e., not all additional dots defining the enhanced edges are reference labeled. The Figure shows how dots can be positioned in both process and scan directions for resolution doubling at the edges. Dots not centered on the grid are at 2× base resolution. The periodic trajectory scan path of the present invention provides the means for placing additional dots at the edges of the image to double resolution at image edges. Images that are edge resolution enhanced by these methods are visually equivalent to, and effectively the same as, images actually produced at 2× the base resolution of the printer. Edge resolution enhancement therefore effectively increases the resolution of the entire image, but requires less printer memory and uses less toner per page than a printer operating at the higher resolution.

Another use of the present invention periodic trajectory scanning techniques is banding correction. The beam deflector offers two mechanisms for the correction of banding. First, because frequency response of the beam deflector extends all the way to DC (zero frequency), it is possible to implement banding correction by adding a bias voltage to the signal used to drive the beam deflector, the bias voltage being determined on a scan by scan basis by y-axis correction circuit 90 using information provided by detectors 50 and 55 (all of FIG. 1). This method has the effect of shifting each periodic trajectory scan path a small positive or negative amount in the process direction as needed to correct drum positioning errors which would otherwise result in banding, and is the preferred method. Second, because dot placement is determined by the timing of laser modulation relative to the phase of the periodic scan trajectory, it is possible to vary dot position in the y direction by selectively advancing or retarding the phase of the laser modulation relative to the phase of the beam deflector. This method is subject to limitations imposed by the shape of the periodic trajectory being used, hence is not as generally useful as the bias voltage method. Drum position detector 55 (of FIG. 1) is used for both techniques, and beam position detector 50 may be used to improve the positional fidelity of the beam deflector.

Figure 15:
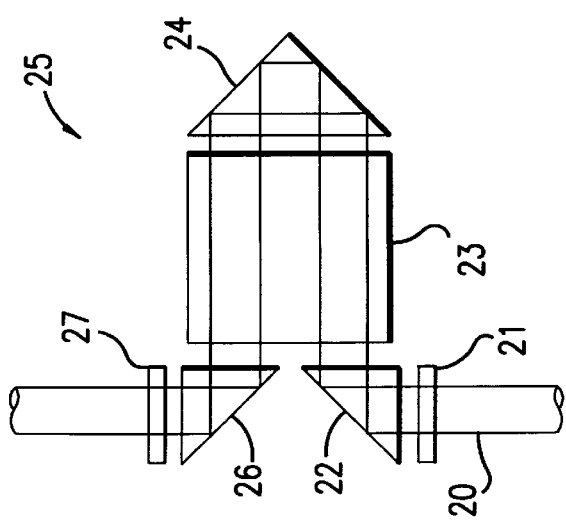
FIG. 15 is a schematic block diagram of a preferred embodiment beam deflector having a folded optical path and used to produce periodic trajectory scan paths of the present invention.

Referring now to FIG. 15, a preferred embodiment of the beam deflector, referred to as the "folded optical path beam deflector" provides an improved means for generating the periodic trajectory scan paths of the present invention. As will be shown, this folded optical path beam deflector may be configured to provide beam deflection in one direction alone, or separately in each of two directions. Although a folded path deflector is disclosed in particular herein, it is obvious that an unfolded path could also be used.

Periodic trajectory scanning as disclosed herein requires beam deflector 25 (FIG. 1) not found in conventional laser printers. As previously discussed, beam deflectors of the electro-optic (E-O) type are preferred for periodic trajectory scanning. The folded optical path beam deflector of the present invention incorporates an electro-optic prism assembly and will be described with reference to FIG. 15. Beam 20 enters first folding prism 22 wherein it is reflected (statically re-directed) at substantially a right angle. Beam 20 is then transmitted through electro-optic prism assembly 23 a first time, wherein it may be dynamically deflected by a small angular amount $\alpha$ in response to an electrical signal applied to the deflector. Beam 20 emerges from E-O prism assembly 23 and enters roof prism 24 wherein beam 20 undergoes two reflections (static re-directions) which cause a substantially 180° change in beam direction. Beam 20 then re-enters E-O prism assembly 23 and is transmitted a second time wherein it may be dynamically deflected a second time by a second small angular amount $\beta$, in response to an electrical signal applied to the deflector. Beam 20 then emerges from E-O prism assembly 23 a second time and enters second folding prism 26 wherein beam 20 is reflected (statically re-directed) at substantially a right angle and is approximately restored to its direction of travel prior to entering first folding prism 22. First phase retardation plate 21 may be included to modify the polarization of beam 20 as it enters the beam deflector to satisfy the polarization requirements of E-O prism assembly 23, E-O prism assemblies generally being constructed from crystalline materials and having specific polarization requirements, as is well known in the art. Second phase retardation plate 27 may be included to modify the polarization of beam 20 as it emerges from beam deflector 25, thus satisfying the polarization requirements of the optical components located in the path of beam 20 between second folding prism 26 and imaging surface 45 (of FIG. 1).

E-O prism assembly 23 of the present invention may be configured in alternative ways to provide alternative beam deflection characteristics as required for specific periodic trajectory scan paths, or to satisfy other laser printer design objectives and constraints.

FIG. 15 illustrates a "double-pass" configuration of E-O prism assembly 23 in which the deflection angles $\alpha$ and $\beta$ imparted to beam 20 during first and second passage through E-O prism assembly 23 are in the same direction and are additive, resulting in a total deflection angle equal to $\alpha+\beta$. This configuration is capable of providing, for example, a simultaneous doubling of deflection angle and deflection rate.

Figure 16:
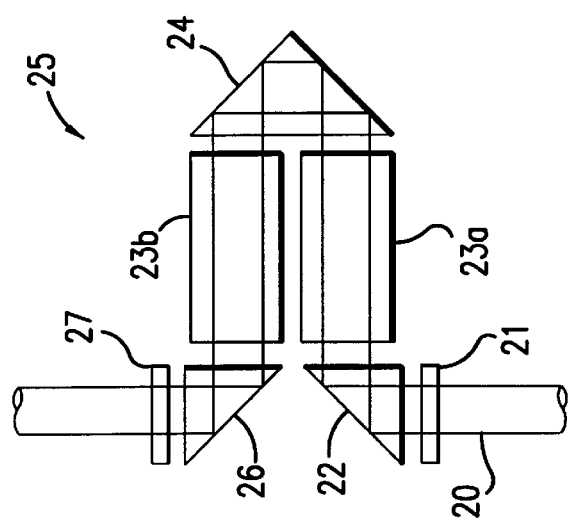
FIG. 16 is a schematic block diagram of a preferred embodiment beam deflector having separate electro-optic prism assemblies for providing beam deflection in the x and y directions.

Another configuration which is especially useful is now described with reference to FIG. 16. In this configuration, E-O prism assembly 23 is divided into separately controllable E-O prism assemblies 23a and 23b to provide two-axis beam deflection capability. During passage through E-O prism assembly 23a, beam 20 is deflected through angle $\alpha$, and during passage through E-O prism assembly 23b, beam 20 is deflected through angle $\beta$. Beam deflections $\alpha$ and $\beta$ now result in perpendicular beam motions at the imaging surface and, being the result of separately controllable x and y signals applied to deflector 25, result in separately controllable x and y motions of beam 20 on imaging surface 45 (FIG. 1).

Figure 17:
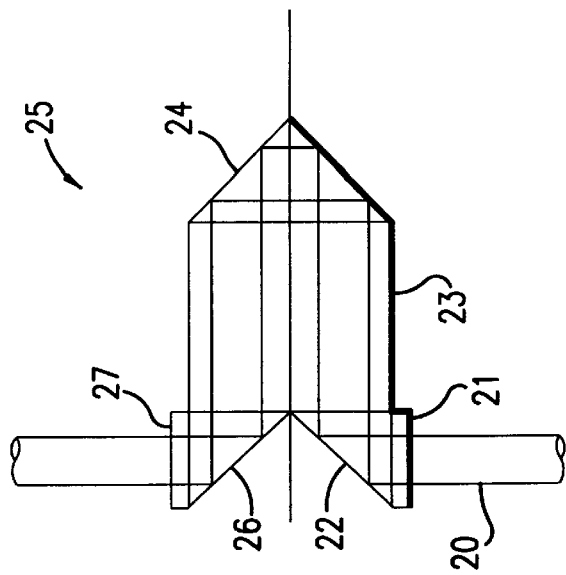
FIG. 17 is a schematic block diagram of a preferred embodiment beam deflector constructed as a permanently bonded "monolithic" assembly.

As illustrated in FIG. 17, beam deflector 25 may be constructed as a permanently bonded monolithic assembly having extreme mechanical and thermal alignment stability, and requiring only 2 surfaces (input and output faces) to be anti-reflection coated. Such a permanently bonded beam deflector assembly may be assembled as a pre-aligned module, permitting "drop in" alignment during printer assembly. Although static re-direction of the beam could be achieved with mirrors rather than prisms, prisms are preferred for monolithic assembly.

Benefits of the preferred embodiment folded optical path beam deflector include:

Deflector occupies a limited portion of the distance between laser 15 and polygon scanner 30, while providing an arbitrarily long beam path within the E-O prism assembly.

Design options permit doubling deflection angle or deflection rate, or both, in a one-axis deflector; or, alternatively, providing two-axis beam deflection capability.

Beam deflector can be constructed as a permanently bonded monolithic assembly having extreme mechanical and thermal alignment stability, and requiring only 2 surfaces (input and output faces) to be anti-reflection coated.

Beam deflector can be constructed as a pre-assembled, pre-aligned module permitting "drop in" alignment during printer assembly.

Requires minimum optical and mechanical modification of existing laser printer designs to add periodic trajectory scanning capability. Permits building product variations with and without periodic trajectory scanning using a maximum number of common parts.

In summary, what has been described above are the preferred embodiments for a system and method for improved scanning techniques in a laser printer whereby printing speed is improved, resolution is enhanced, and banding effects are reduced. It will be obvious that the present invention is easily implemented utilizing any of a variety of hardware and/or software existing in the art. Furthermore, while the present invention has been described by reference to specific embodiments, it will be obvious that other alternative embodiments and methods of implementation or modification may be employed without departing from the true spirit and scope of the invention.

What is claimed is:

1. A method of scanning a beam across a surface in an image forming device, the method comprising the steps of:

(a) positioning the beam in a scan direction by a scanner; and (b) positioning the beam in the scan direction and a cross-scan direction by a deflector;

whereby the beam is directed across the surface in a two-dimensional periodic trajectory.

2. The method of claim 1 wherein a plurality of rows of pixels are formed by the periodic trajectory in a single scan pass of the beam across the surface.

3. The method of claim 1 wherein a substantially rectilinear grid of available pixel locations is formed by the periodic trajectory in a single scan pass of the beam across the surface.

4. The method of claim 3 wherein the rectilinear grid of available pixel locations is substantially rectangular having uniform spacing in the scan direction and uniform spacing in the cross-scan direction.

5. The method of claim 3 including modulating the beam at selected pixel locations.

6. The method of claim 5 further including modulating the beam whereby, selectively, image-forming speed is enhanced, resolution is enhanced, pixel placement accuracy is enhanced, or any combination of these occurs.

7. The method of claim 6 wherein resolution is enhanced by selectively increasing resolution at an edge of an image.

8. The method of claim 5 wherein a timing of beam modulation is selected relative to a phase of the periodic trajectory to control pixel placement.

9. The method of claim 1 wherein a wave shape of the periodic trajectory is selected from the group consisting of a triangle wave shape, a sawtooth wave shape, a Lissajous wave shape, a rectangle wave shape, and a sinusoidal wave shape.

10. The method of claim 1 wherein the deflector is an electro-optic deflector.

11. The method of claim 1 wherein the step of positioning the beam in the scan direction by the deflector includes positioning the beam in a retrograde direction relative to the positioning of the beam in the scan direction by the scanner.

12. The method of claim 1 wherein the beam is directed across the surface in a two-dimensional periodic trajectory independent of any image data being processed by the image forming device.

13. The method of claim 1 wherein the imaging forming device includes a printing device.

14. The method of claim 1 wherein the step of positioning the beam in the scan direction by the deflector includes positioning the beam in a retrograde direction relative to the positioning of the beam in the scan direction by the scanner.

15. The method of claim 1 wherein the periodic trajectory is formed independent of any image data being processed by the image forming device.

16. In an imaging device having a generally linear beam scan path produced by a scanner across a surface, a method of modifying the beam scan path comprising the steps of:
(a) positioning the beam in a scan direction by the scanner; and
(b) deflecting the beam with a deflector in the scan direction and in a cross-scan direction to form a periodic trajectory scan path across the surface, including deflecting the beam in a retrograde direction relative to the positioning of the beam in the scan direction by the scanner, thereby providing a substantially rectilinear grid of available pixel locations for selective beam modulation.

17. An imaging device comprising:
(a) a scanner for positioning a beam in a scan direction on an imaging surface;
(b) a deflector means for selectively deflecting the beam in the scan direction and a cross-scan direction wherein the scanner and the deflector direct the beam across the surface in a two-dimensional periodic trajectory; and,
(c) means for modulating the beam at selected locations in the periodic trajectory.

18. The imaging device of claim 17 wherein the periodic trajectory provides for a plurality of rows of pixels to be completed in a single scan pass of the beam across the surface.

19. The imaging device of claim 17 wherein the periodic trajectory provides a substantially rectilinear grid of available pixel locations in a single scan pass of the beam across the surface.

20. The imaging device of claim 19 wherein the rectilinear grid of available pixel locations is substantially rectangular.

21. The imaging device of claim 19 wherein the rectilinear grid of available pixel locations is substantially rectangular having uniform spacing in the scan direction and uniform spacing in the cross-scan direction.

22. The imaging device of claim 17 wherein the selected locations in the periodic trajectory are selected pixel locations.

23. The imaging device of claim 22 further including modulating the beam whereby, selectively, image-forming speed is enhanced, resolution is enhanced, pixel placement accuracy is enhanced, or any combination of these occurs.

24. The imaging device of claim 23 wherein resolution is enhanced by selectively increasing resolution at an edge of an image.

25. The imaging device of claim 22 further including timing means wherein a timing of beam modulation is selected relative to a phase of the periodic trajectory to control pixel placement.

26. The imaging device of claim 17 wherein the periodic trajectory has a wave shape selected from the group consisting of a triangle wave shape, a sawtooth wave shape, a Lissajous wave shape, a rectangle wave shape, and a sinusoidal wave shape.

27. The imaging device of claim 17 wherein the deflector is an electro-optic deflector.

28. The imaging device of claim 17 wherein the deflector comprises:
(a) first redirection means for statically re-directing the beam;
(b) first deflection means for dynamically deflecting the beam responsive to a first applied signal, the first deflection means disposed so as to receive the beam from the first redirection means;
(c) second redirection means for statically re-directing the beam and disposed so as to receive the beam from the first deflection means;
(d) second deflection means for dynamically deflecting the beam responsive to a second applied signal, the second deflection means disposed so as to receive the beam from the second redirection means; and,
(e) third redirection means for statically re-directing the beam and disposed so as to receive the beam from the second deflection means.

29. The imaging device of claim 28 wherein the first and second deflection means for dynamically deflecting the beam cause beam motion in substantially a same direction at the imaging surface.

30. The imaging device of claim 28 wherein the first and second deflection means increase deflection angle, increase deflection speed, or both.

31. The imaging device of claim 28 wherein the first and second deflection means for dynamically deflecting the beam are a single deflector.

32. The imaging device of claim 28 wherein the first and second deflection means for dynamically deflecting the beam cause beam motion in substantially perpendicular directions at the imaging surface.

33. The imaging device of claim 28 wherein the first and second deflection means for dynamically deflecting the beam are electro-optic deflectors.

34. The imaging device of claim 28 wherein the beam has a given input beam axis prior to being redirected by the first redirection means, and wherein the third redirection means provides an output beam axis substantially parallel to and coincident with the input beam axis.

35. The imaging device of claim 28 wherein the first, second and third redirection means for statically re-directing the beam are internally reflective prisms.

36. The imaging device of claim 28 wherein all the redirection and deflection means are bonded together to form a monolithic assembly.

37. The imaging device of claim 28 wherein polarization of the beam is controlled by including a first phase retardation plate disposed for receiving the beam prior to the first deflection means, and further including a second phase retardation plate disposed for receiving the beam after the second deflection means.

38. The imaging device of claim 17 wherein the scan direction in which the deflector means deflects the beam includes a retrograde direction relative to positioning of the beam in the scan direction by the scanner.

39. The imaging device of claim 17 wherein the periodic trajectory is formed independent of any image data being processed by the imaging device.

40. The imaging device of claim 17 wherein the deflector means is a one-axis deflector rotationally aligned to produce beam motion on the imaging surface along a path which is rotated by an angle $\theta$ with respect to the positioning of the beam in the scan direction by the scanner.

41. The imaging device of claim 17 wherein the deflector includes two one-axis deflectors.

42. The imaging device of claim 17 wherein the deflector is a two-axis deflector.

43. The imaging device of claim 17 wherein the imaging device includes a printing device.

44. An imaging device comprising:

(a) a scanner disposed for moving a beam in a scan direction on an imaging surface of the imaging device;

(b) a deflector having at least one direction of deflection and disposed in the imaging device for deflecting the beam in a direction including non-perpendicular to the scan direction of the scanner;

(c) means for controlling the scanner and deflector whereby the beam is directed across the surface in a two-dimensional periodic trajectory; and, (d) means for modulating the beam at selected locations in the periodic trajectory.

* * * * *